United States Patent Office 3,840,489
Patented Oct. 8, 1974

3,840,489
NOVEL VINYLAMIDE DRY STRENGTH RESINS AND PAPER CONTAINING THE SAME HYDROPHILIC-HYDROPHOBIC VINYLAMIDE POLYMERS AND MANUFACTURE OF PAPER
Edward Strazdins, Fairfield, Conn., assignor to American Cyanamid Company, Stamford, Conn.
No Drawing. Filed Dec. 23, 1971, Ser. No. 211,623
Int. Cl. C08f 45/24; D21h 3/38
U.S. Cl. 260—29.6 TA                                11 Claims

ABSTRACT OF THE DISCLOSURE

Aqueous dispersions of hydrophilic-hydrophobic polymers which consist essentially of unsubstituted acrylamide linkages and hydrophobic vinyl linkages in weight ratio between 60:40 and 95:5 are dry strengthening agents suitable for use as beater additives in the manufacture of paper. The polymer may be non-ionic or it may have a minor content of ionic substituents. Both the non-ionic and ionic forms are well absorbed by the fibers. The polymer may carry thermosetting substituents and so provide wet strength.

---

The present invention relates to aqueous dispersions of novel hydrophilic-hydrophobic vinylamide polymers having a content of hydrophobic vinyl linkages and to paper of improved dry strength (and if desired wet strength as well) composed of water-laid cellulose fibers having a uniformly adsorbed content of the polymer. The invention includes the polymer in dry, free-flowing and in aqueous dispersion state (i.e., in solution or in colloidal or semi-colloidal aqueous dispersion state) and also includes processes for the manufacture of paper of improved dry strength therewith.

It is known that paper of improved dry strength is obtained when a low molecular weight ionic vinylamide polymer is deposited on the papermaking fibers while they are in aqueous dispersion and the fibers are then processed into paper in the usual way. Paper which possesses wet strength (in addition to improved dry strength) is produced when the polymer contains thermosetting substituents. The polymers heretofore used for the purpose have invariably carried ionic substituents in sufficient number to provide them with a sufficiently large positive or negative (cationic or anionic) charge to carry them to, and to deposit them upon the fibers in more than negligible amount. The polymers of this class which have a net positive charge (i.e., the cationic polymers) are self-substantive to cellulose fibers and require no fixing agent since cellulose fibers normally carry a net negative charge. The polymers of this class which have a net negative charge (i.e., the anionic polymers) generally require a fixing agent (typically alum) which is thought to be positive and so acts as agent which couples the electronegative fibers with the electronegative dry strength polymer. In the past, therefore, in each instance deposition of the polymer on the fibers has been primarily accomplished by electrostatic attraction.

It has furthermore been generally believed that the dry strengthening properties of the polymers of this class is ascribable to the vinylamide linkages therein. It has therefore been believed that for maximum strengthening properties the polymer should consist essentially of these linkages and that the proportion of ionic linkages should be no larger than that required to cause deposition of the polymer on the fibers.

The most widely-used polymer of this class conforms with this definition and is the 90:10 molar ratio acrylacide:acrylic acid copolymer of Canadian Patent No. 477,-265 (1951). While it has been recognized that hydrophobic non-ionic linkages may be tolerated in small proportions in the polymer, it has been generally believed that those linkages are non-functional and that they do not act as equivalents or as substitutes either for the vinylamide linkages, or for the ionic linkages; cf. U.S. Pats. Nos. 2,884,057; 2,884,058; 2,890,978; and 3,556,932.

The discovery has now been made that the aforesaid hydrophobic linkages become functional when they are present in critical proportion in the polymer, in that they confer true cellulose substantivity upon the polymer. I have discovered that when these linkages are present in the polymer in minor amount (i.e., in amount at least 5% of the weight of the polymer and in amount sufficiently small so that the polymer is substantially autodispersible in water) the polymer possesses true cellulose-substantivity and very satisfactory dry strengthening properties even when it is non-ionic. I have accordingly discovered that such hydrophobic linkages, when present in the proportion stated, function as if they possessed ionic charges.

By the term "substantially autodispersible" I mean that the polymer disperses itself either when allowed to stand in water or when it is gently stirred in water. The aforesaid dispersions range from opaque milk-like latices to apparently clear solutions, depending upon the particular hydrophobic substituents present and the proportion thereof which the polymer contains.

The present invention therefore provides an aqueous water-dilutable dispersion of a vinylamide polymer comprising at least 60 weight percent of unsubstituted vinylamide linkages as dry strengthening components and at least 5 weight percent of hydrophobic linkages as components improving the adsorptivity of said polymer by cellulose fibers in aqueous suspension. The ratio between the unsubstituted linkages and the hydrophobic linkages is between about 60:40 and 95:5 by weight and is sufficiently within the range so that the polymer is substantially autodispersible in water.

The proportion of hydrophobic linkages within this range may provide dispersions which are clear. Best dry strength, however, in most instances is obtained when the proportion of hydrophobic substituents is sufficiently large that the dispersion is hazy or opaque.

The molecular weights of the polymers of the present invention are such that an aqueous dispersion of the polymer at 10% by weight polymer content, at pH 7.0 and at 25° C., has a viscosity of at least 250 and preferably 500 centipoises.

When the viscosity is below this range, the polymer possesses comparatively poor dry-strengthening properties. The dispersions have a viscosity under the same conditions of less than 200,000 and preferably less than 100,-000, because generally high molecular weight polymers flocculate the long papermaking fibers in the pulp without providing increased strength.

The dispersions of the present invention, in preferred embodiments, possess the following beneficial properties.

1. The polymer content thereof is rapidly and efficiently adsorbed by unbleached cellulose fibers in aqueous suspension and provides a very satisfactory dry strengthening action even when the suspension is "dirty," i.e., even when it has a content of black liquor solids, wood sugars, alum, dissolved sulfate ions and other contaminants provided by unbleached kraft and other unbleached pulps in proportions heretofore believed very detrimental. In the past, dry strengthening polymers have been virtually ineffective in these circumstances. The present invention therefore renders practical the manufacture of paper of improved strength from unbleached and unwashed pulps produced by the kraft and similar processes, and from pulps suspended in repeatedly recycled white water. A retention figure as high as 71.8% (based on a nitrogen analysis of the paper) has been recorded in the case of a non-ionic polymer, and a higher retention may be expected in the case of polymers which carry ionic substituents.

2. The polymer content is well adsorbed over the normal papermaking pH range 4 to 10, and thus eliminates need for control of pH in the papermaking system.

3. The polymers in the dispersions may carry a small proportion of ionic substituents (cationic or anionic). These substituents, in pulps having respectively appropriate pH values, supplement without supplanting the activity of the hydrophobic linkages and do not interfere with the activity of the hydrophobic substituents in causing adsorption of the polymer by the fibers.

4. The dispersions are effective when used in connection with fibers which carry a soap size and beneficially elevate the pH at which the soap sizing step can be performed. The polymers therefore permit the manufacture of rosin sized paper at a pH close to neutrality, and in this respect they possess a utility outside of the dry strengthening field. The term "soap sizing" as used herein includes the sizing imparted by rosin sizing and black liquor acids.

5. The dispersions increase the drainage rate of the pulp and decrease the cellulose content of the white water with at most a moderate detrimental effect upon the uniformity or "formation" of the paper produced by the process. The polymer thus evidently causes extensive flocculation of the fines but little flocculation of the fibers of papermaking length.

6. The dispersions impart very satisfactory dry strength when the wet web is dried at room temperature but also impart very satisfactory dry strength when the web is dried in the customary range of 190° F. to 250° F. For this and for other reasons disclosed herein the polymers do not require paper manufacturers to learn any new technique.

7. The dispersions are adequately storage-stable at about pH 6 and lose their dry strengthening efficiency at an unusually slow rate.

More in detail, the compositions of the present invention are water-dilutable dispersions of polymers composed of hydrophilic vinylamide linkages as the principal dry-strength imparting component and of hydrophobic vinyl linkages as component improving the adsorptivity of the polymer by cellulose fibers in aqueous suspension. Polymers which impart only dry strength comprise at least about 60 mol percent of unsubstituted acrylamide linkages. The proportion of hydrophilic linkages to the hydrophobic linkages in the polymer is within the range of about 60:40 and 95:5 by weight. Moreover, these linkages are present in a ratio within this range such that the polymer is substantially autodispersible in water at a pH between 4 and 9. The molecular weight of the polymer is such that a dispersion of the polymer at 10% solids, pH 7.0 and 25° C. has a viscosity between 250 and 200,000 centipoises and preferably 500 to 100,000. When the polymer contains ionic substituents, the proportion of these substituents is such that at least a substantial proportion of the absorptivity of the polymer by the fibers is the consequence of the hydrophobic vinyl linkages present.

The polymers of the present invention thus comprise two sets of linkages (the hydrophilic vinylamide linkages and the hydrophobic vinyl linkages) each of which performs a distinctively different function.

The first set of linkages are provided by such water-soluble copolymerizable monomers as acrylamide, allylsulfonamide, N-acetamidoacrylamide, N-acetamidoallylsulfonamide, and N,N'-diacetamidomaleamide. They may also be provided by forming a polymer containing hydrophilic vinyl acid linkages (e.g., acrylic acid and allylsulfonic acid linkages) and amidating an appropriately large proportion of the acid substituents present. The polymers contain as large a proportion of unsubstituted vinylamide linkages as is practicable consonant with the other requirements set forth herein. It is these linkages which form the fiber-polymer-fiber bonds and which thus provide the dry strengthening action of the polymers once the polymers have been deposited on the fibers.

The second set of linkages are hydrophobic vinyl linkages. They are present in at least about 5 weight percent. Such linkages are provided by water-insoluble vinyl monomers for example, styrene, acrylonitrile, the chloro- and chloromethylstyrenes, the vinylnaphthalenes, the alkyl acrylates and methacrylates (including methyl, ethyl, propyl, butyl, and lauryl acrylate), dibutyl maleate, dibutyl vinylphthlate, vinyl carbazole, and acrylamidostearic acid having the theoretical formula:

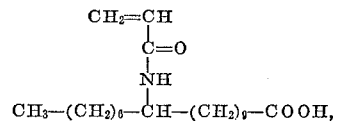

The polymer may contain several hydrophobic linkages. In general, any water-insoluble hydrophobic vinyl monomer can be used to provide hydrophobic linkages so long as the monomer is emulsifiable and is copolymerizable with water-soluble vinylamide monomers.

The primary function of hydrophobic vinyl linkages is to cause the polymer to be deposited on and to be retained by the cellulose fibers during the papermaking operation. The invention primarily rests on my discovery of this phenomenon. It is this phenomenon which for the first time permits a dry strength resin to be successfully applied to unbleached fibers suspended in recycled white water having a high content of black liquor solids. Up to the present it has not even been suspected that hydrophobic organic substituents of the types mentioned have the property of performing in this manner. Applicant does not know the explanation of either of these phenomena and therefore does not wish to be bound by any theory.

The aforesaid hydrophobic linkages are present in critical proportion. Their proportion is not so large that the polymer is indispersible in water. Their proportion is sufficiently small so that the polymer autodisperses in water (i.e., so that it forms a stable clear or non-creaming slightly opalescent to milky latex-like suspension when allowed to stand with water at a temperature up to 100° C. or when gently stirred therewith).

If desired, the polymer can contain supplementary ionic linkages to assist the hydrophobic linkages in depositing the polymer on the fibers.

Thus the polymer may contain cationic hydrophilic linkages. Suitable cationic linkages are provided by including 2-vinylpyridine, diallyl dimethyl ammonium chloride, 2-(diethylamino)ethyl acrylate in the reaction mixture. Cationic substituents can also be introduced by reacting a small proportion of the amide substituents of the polymer with ethylene diamine.

Alternatively, the polymer may contain a similarly small proportion of hydrophilic anionic linkages. Suitable such linkages can be provided by including a copolymerizable water-soluble vinyl acid monomer in the polymerization reaction mixture. Suitable monomers for the purpose are maleic anhydride (which hydrolyzes to maleic acid), maleic acid, maleamic acid, acrylic acid, methacrylic acid and allylsulfonic acid.

Other linkages which can be present in the polymers of the present invention are vinyl alcohol linkages, unsubstituted ethylene and propylene linkages, and the polyether-containing linkages formed by reacting vinyl alcohol or allyl sulfonamide or acrylic acid linkages with ethylene oxide. These linkages act primarily as dilutants or spacers and should not be present in sufficiently large proportion to affect the essential character of the polymers.

Still other linkages which can be present are linkages which carry substituents which render the polymer thermosetting and so confer wet-strengthening properties thereon. Such linkages include those formed by reacting a part of the vinylamide linkages with glyoxal, as has been disclosed in U.S. Pat. No. 3,556,932.

The ratio of the two linkages of primary importance (the hydrophilic vinylamide linkages and the hydrophobic vinyl linkages) varies from instance to instance depending principally upon the comparative hydrophilic strengths of the linkages of the first set and on the hydrophobic strengths of the linkages of the second set, on the molecular weight of the hydrophobic linkages, on the presence or absence of supplementary hydrophilic linkages (including ionic linkages), on the pH of the aqueous medium, and on the lignin content of the fibers to be treated. Moreover, in certain instances the hydrophobic component may polymerize less uniformly with the hydrophilic component than in other instances and so increase or decrease in its effectiveness. As a result, the preferable ratio between the linkages of primary importance in any instance is most easily determined by laboratory trial. In practice, we have found that the ratio of the hydrophilic to the hydrophobic linkages generally lies within the range of about 95:5 and 60:40 weight percent. The dispersions of the present invention are particularly useful for the treatment of pulps of unbleached fibers (including groundwood fibers). Dispersions wherein the polymers contain vinyl acid linkages can be usefully employed in the treatment of alkaline pulps, but they are specially useful for the treatment of pulps composed of fibers (bleached and unbleached) which have been sized with rosin or other soap size at an acid pH. The anionic linkages increase the amount of polymer which is adsorbed by the fibers at a low pH in the presence of alum, and also improve the dry strength imparted by each increment of the polymer. The cationic polymers are specially useful in connection with acidic pulps to which no alum or similar agent has been added.

Dispersions of polymers which are substantially non-ionic impart dry strength when added to acid, neutral and alkaline pulps in the normal papermaking range of 4 to 10. The number of ionic linkages, when present, should not be so large as to decrease the effectiveness of the polymer for dry strengthening purposes, and this can be determined by trial in any particular instance.

The dispersions of the present invention which impart only dry strength (i.e., which impart substantially no wet strength) are conveniently prepared by any of the conventional emulsion polymerization processes wherein a hydrophobic vinyl monomer (or mixture of hydrophobic vinyl monomers) is added with vigorous agitation to an aqueous solution of the hydrophilic vinylamide monomer (or mixture of hydrophilic vinylamide monomers), an ionic copolymerizable monomer (if desired) an appropriate polymerization catalyst, and an emulsifying agent for the hydrophobic vinyl monomer. Low viscosity dispersions are preferred and are most easily prepared by the use of a large amount of initiator, about the minimum effective amount of emulsifier, and rapid agitation. In instances where the monomers are soluble in a mutual organic solvent or in water, the dispersions can be prepared by any desired solution polymerization method.

The most effective dispersion of a substantially non-ionic polymer has been prepared by copolymerizing acrylamide with styrene in 90:10 molar ratio by the foregoing method, and by copolymerizing acrylamide, acrylonitrile and styrene in 83:7:10 molar ratio (equivalent to a ratio of 80:10:5 by weight). The most effective anionic dispersion is prepared by copolymerizing acrylamide, styrene and acrylic acid in about 85:10:5 molar ratio or by hydrolyzing about 5 mols of the acrylamide in the 90:10 acrylamide:styrene copolymer. The best cationic dispersion is formed by copolymerizing acrylamide, styrene and 2-(dimethylamino)ethyl acrylate in 85:10:5 molar ratio.

The polymers of the present invention can be recovered in dry form by removal of the water (under vacuum, or by azeotropic distillation, or by addition of anhydrous methanol or anhydrous acetone). The resulting dry polymers are generally non-tacky, and can be comminuted to a free-flowing powder form. A polymer dispersion according to the present invention is reconstituted when the polymer powder is redispersed in water at pH 8. Polymers which are thermosetting are best recovered by precipitation with anhydrous methanol.

Paper is made according to the present invention by forming an aqueous suspension of cellulose papermaking fibers having a pH in the normal papermaking range of 4 to 10, adding to said suspension an effective amount of an aqueous dispersion of a polymer of the present invention, forming the suspension into a web, and drying the web.

The process is specially useful in connection with unbleached fibers suspended in aqueous medium having a high dissolved sulfate ion content (e.g. 500–1,000 p.p.m.) and containing the usual amount (up to 7% on the fibers) of black liquor components normally present in unbleached fiber pulp.

Paper of substantially improved dry strength results when a non-ionic polymer dispersion of the present invention is added over the pH range of 4 to 10. The pulp may but need not contain alum as adsorption of the polymer of the present invention by cellulose fibers is not dependent upon the presence of alum. The presence of the hydrophobic groups in anionic acrylamide polymers significantly expands the pH range over which the polymers function as effective dry strengthening agents. Dispersions of cationic polymers according to the present invention give good dry strength when added to anionic pulps (particularly well washed unbleached pulps) which contain substantially no aluminum or other dissolved polyvalent cations.

A perceptible improvement in dry strength is generally obtained when the amount of polymer added is as little as 0.01%. In practice, I add between about 0.1% and 1.0% of the polymer based on the dry weight of the fiber as amounts in this range produce about the best strengthening effect per increment of polymer added. It will be understood, however, that larger amounts, up to 3.0% or more, produce higher levels of dry strength, and that even very small amounts may produce a significant benefit.

The invention is also particularly adapted to the treatment of fibers which have been treated with a sizing agent, either ordinary rosin size, fortified rosin size, or the hydrophobic components of black liquor. Preferably, the size is deposited on the fibers prior to addition of the polymer dispersion of the present invention although the polymer dispersion may be added first with good results if desired.

The polymer may be added at any convenient point in the papermaking operation, but is most conveniently added near the headbox or at the fan pump.

The polymer develops its dry strengthening properties when the paper is dried at room temperature. However, the polymer when not containing wet strengthening substituents is not affected by heat, the wet web therefore may be dried on rolls having a temperature in the range of 190° F.–250° F. as is customary. When the polymer contains wet strengthening substituents, the web should be dried at such elevated temperature as is necessary to develop the wet strengthening properties of the polymer.

If desired, the polymer can carry thermosetting substituents so that it confers wet strength in addition to dry strength. A variety of thermosetting substituents suitable for the purpose is known and is suitable for the purpose. Among these are glyoxal substituents which can be introduced by methods disclosed in U.S. Pat. No. 3,556,932.

The polymer should contain a total of at least about 70 weight percent of unsubstituted and glyoxal-substituted acrylamide linkages, the unsubstituted linkages providing dry strength and the glyoxal-substituted linkages producing both dry- and wet-strength. If desired, substantially all of the acrylamide substituents can be glyoxalated. The number of glyoxal substituents is at least sufficient to render the polymer thermosetting. Preferably, ratio of unsubstituted acrylamide linkages to the glyoxal substituted linkages in the polymer is between about 80:20 to 50:50, as in this range the polymer produces very satisfactory dry strength and overuse of glyoxal is avoided. The polymer may have any molecular weight so long as a dilute (e.g., 0.1%–5%) aqueous dispersion thereof is of pumpable viscosity. However, preferably the viscosity of the dispersion is low (e.g., 100 to 1,000 centipoises at 10% solids, pH 7 and 25° C.) as such dispersions possess superior storage-stability. Dispersions of this low viscosity are obtained from starting polymer dispersions of appropriately low viscosity. Any of the dispersions of the non-ionic, cationic and anionic polymers can be used as the material to be glyoxalated. The glyoxalated acrylamide linkages referred to have the formula:

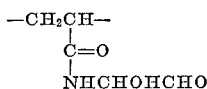

The thermosetting dispersions are employed in the same manner as the dispersions which impart dry strength only. The polymer thermosets when the wet web is dried on rolls having a temperature in the range of 190° F.–250° F.; a part of the glyoxal substituents react with the cellulose as the wet web is dried. The paper is composed of cellulose fibers bonded together by an adsorbed content of the polymer in thermoset state.

A process for the manufacture of paper by use of the dispersion disclosed herein and the resulting paper are claimed in my copending application Ser. No. 450,026 filed on Mar. 11, 1974.

The invention is more particularly described by the examples which follow. These examples are preferred embodiments of the invention and are not to be regarded as limitations thereon. Percentages based on the weight of the fibers are based on the dry weight of the fibers. Parts are by weight unless otherwise stated.

EXAMPLE 1

The following illustrates the preparation of dispersion of a substantially non-ionic acrylamide-styrene copolymer by emulsion copolymerization.

To 14.6 g. of styrene suspended in a solution of 85.4 g. of acrylamide in 550 g. of water at pH 4.5 is added 1.0 g. of sodium dicyclohexyl sulfosuccinate. The suspension is sparged with $N_2$ to remove all $O_2$ and heated to 75° C. There is then added 0.5 g. of ammonium persulfate in 17 g. of water. The mixture is rapidly stirred at 75° C. under nitrogen for 16 hours. The product is a milky latex which is opaque when viewed in a 1,000–cc. graduate and does not cream on standing. It has a viscosity of about 2,000 centipoises at 10% polymer solids and 25° C. and an intrinsic viscosity of about 1.3. The polymer has an average content of acrylamide and styrene linkages in about 89:11 molar ratio and is substantially non-ionic. The latex is storage-stable at 35° C.

EXAMPLE 2

The procedure of Example 1 is repeated except that the sodium dicyclohexyl sulfosuccinate is omitted and the styrene is replaced with 30 g. of acrylonitrile. The product is a clear dispersion which exhibits a faint opalescent haze and which has a Tyndall effect when a beam of light is passed transversely therethrough in the dark.

EXAMPLE 3

The following illustrates the preparation of a polymer according to the present invention containing two different hydrophobic vinyl linkages.

The procedure of Example 1 is repeated except that the monomer charge is composed of 70.0 g. of acrylamide, 4.55 g. of acrylonitrile and 12.5 g. of styrene. A similar latex is obtained.

EXAMPLE 4

The following illustrates the preparation of a colloidal aqueous dispersion of a polymer composed of acrylamide and isobutylene linkages in 90:10 molar ratio.

Into a glass pressure vessel is placed 24 g. of acrylonitrile, 0.77 g. of ammonium persulfate, 0.43 g. of sodium metabisulfite, 4.0 g. of sodium dicyclohexyl sulfosuccinate emulsifier and 300 cc. of water. The resulting solution is adjusted to pH 3 by addition of sulfuric acid, purged with $N_2$, and then cooled to −10° C., and to this is added 56 g. of very cold liquid isobutylene. The resulting mixture is promptly placed into a laboratory rocking autoclave and rocked for 24 hours at room temperature. The autoclave is then opened and the resulting polymer is precipitated by addition of acetone and recovered. Analysis shows that it is composed of acrylonitrile and isobutylene linkages in 79:21 molar ratio.

To 10 g. of this polymer is added 3 cc. of water, 70 g. of concentrated $H_2SO_4$ and 100 g. of glacial acetic acid and the mixture is stirred for 100 minutes at 65° C. The polymer is then precipitated with acetone and recovered. Analysis shows that the resulting polymer is composed of acrylamide, acrylonitrile and isobutylene linkages in 75:4:21 molar ratio and that the polymer contains no more than a trace of carboxy substituents.

The polymer disperses readily in water forming a cloudy latex.

EXAMPLE 5

The following illustrates the preparation of an aqueous dispersion of an acrylamide:methyl methacrylate copolymer.

The procedure of Example 1 is repeated except that the mixture of monomers is composed of 82 g. of acrylamide and 13.1 g. of methyl methacrylate. A similar dispersion is obtained. The product is an opaque white latex similar to that of Example 1 composed of acrylamide and methyl methacrylate linkages in 90:10 molar ratio.

EXAMPLE 6

The following illustrates the formation of a substantially non-ionic molar ratio acrylamide:styrene copolymer by the solution copolymerization method and the preparation of an aqueous dispersion of the polymer.

To 700 cc. of a 60:40 by weight deoxygenated dioxane:water solution of 92.0 g. (1.32 mol) of acrylamide and 8.0 g. of styrene (0.077 mol) under nitrogen at 75° C. is added with vigorous agitation 1.5 g. of azobisisobutyronitrile as catalyst. The solution is allowed to react for 16 hours at 75° C. under nitrogen.

The polymer is precipitated by addition of methanol and is recovered and dried. When dry the polymer is crushed and becomes a free-flowing powder. It contains acrylamide and styrene linkages in about 95:5 molar ratio.

To 15 g. of the powder is added 85 cc. of water adjusted to pH 9. The polymer swells and softens and forms a hazy dispersion when shaken for a few minutes.

EXAMPLE 7

The following illustrates the preparation of an aqueous dispersion of an acrylamide:vinyl acetate copolymer.

The procedure of Example 6 is repeated except that the mixture of monomers is replaced by a 60:40 by weight acrylamide:vinyl acetate mixture. About 60% of the charge polymerizes; the product is an acrylamide:vinyl acetate copolymer in about 92:8 molar ratio. The polymer disperses when shaken with hot water forming a cloudy dispersion therein.

EXAMPLE 8

The following illustrates the preparation of an aqueous dispersion of a polymer composed of acrylamide and acrylamidostearate linkages.

Solution A is prepared by dissolving 4.0 g. of commercial acrylamidostearic acid having the theoretical formula

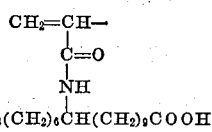

$$CH_3(CH_2)_6\overset{|}{C}H(CH_2)_9COOH$$

(acid number 160) in 8 g. of absolute methanol and adding to this 7.6 ml. of 1N KOH to insure solubility of the monomer when mixed with the acrylamide monomer in aqueous solution. Nitrogen is bubbled through the solution for 30 minutes to remove all traces of oxygen.

Solution B is an oxygen-free solution of 20 g. of acrylamide in 200 cc. of boiled water.

Solutions A and B are mixed under nitrogen blanket and 0.08% of ammonium persulfate and 0.32% of 3.3′,3″-nitrilo-tris-propionamide catalyst is added. The mixture is stirred and held at 20° C., cooling being applied as necessary. After 2–3 hours the mixture thickens. After 5 hours at 20° C. the reaction is terminated by diluting the mixture to 1.0% solids with water. The product is a turbid dispersion. The polymer thus prepared is composed of about 96.1 mol percent of acrylamide linkages and 3.9 mol percent of acrylamidostearate linkages, equivalent to 83.4 and 16.6 weight percent.

EXAMPLE 9

The following illustrates the effect of the acrylamide:styrene ratio upon the appearance of the aqueous dispersion.

The procedure of Example 1 is repeated except that the weight of the acrylamide is increased to 94 g. (1.34 mol) and the weight of styrene is decreased to 7.7 g. (0.074 mol).

The product is a cloudy aqueous dispersion. The polymer is composed of acrylamide and styrene linkages in 95:5 molar ratio.

EXAMPLE 10

The procedure of Example 1 is repeated except that the amount of acrylamide is decreased to 80 g. (1.13 mol) and the amount of styrene is increased to 21 g. (0.202 mol). The product is a latex resembling that of Example 1. The average molar ratio of acrylamide to styrene linkages in the polymer is 85:15.

EXAMPLE 11

The following illustrates the preparation of a polymer according to the present invention containing a small proportion of anionic linkages as supplements for the hydrophobic styrene linkages.

The procedure of Example 1 is repeated except that the monomers are acrylamide (80.4 g.), acrylic acid (4.2 g.) and styrene (15.4 g.). The product is a latex wherein the polymer has an average content of acrylamide, acrylic acid and styrene linkages in 85:5:10 molar ratio.

EXAMPLE 12

The following illustrates the preparation of an anionic polymer according to the present invention by post-treatment of a non-ionic hydrophilic-hydrophobic vinylamide copolymer.

To the latex of Example 1 is added 5 g. of sodium hydroxide and the solution is heated at 80° C. until titration indicates that about 5 mol percent of the amide substituents present have hydrolyzed. The product is a polymer having an average content of acrylamide, acrylic acid and styrene linkages in about 84.5:4.5:11 molar ratio.

EXAMPLE 13

The following illustrates the preparation of a polymer according to the present invention which carries sulfonic acid substituents.

The procedure of Example 1 is repeated except that the amount of acrylamide is decreased to 69.5 g. and is replaced by 9.2 g. of vinylbenzenesulfonic acid. The resulting polymer is composed of acrylamide, vinylbenezenesulfonic acid and styrene linkages in about 83:4.2:12.8 molar ratio.

EXAMPLE 14

The following illustrates the preparation of a polymer according to the present invention carrying cationic linkages.

The procedure of Example 1 is repeated except that the amount of acrylamide is decreased to 80.0 g. and is partly replaced by 6 g. of diallyl dimethyl ammonium chloride as the cationic component. The polymer contains acrylamide linkages, linkages derived from the diallyl dimethyl ammonium chloride and from the styrene in molar ratio of about 85.8:2.8:11.4. The product is a cloudy dispersion which is strongly cationic.

EXAMPLE 15

The procedure of the foregoing example is repeated except that the cationic component is replaced by 7.2 g. (0.045 mol) of 2-(dimethylamino)ethyl methacrylate. A similar dispersion is obtained.

EXAMPLE 16

The procedure of the foregoing is repeated except that the cationic component is replaced by 6.0 g. of 2-methyl-5-vinylpyridine. A similar dispersion is obtained.

EXAMPLE 17

The following illustrates the preparation of a cationic latex according to the present invention by a process wherein a non-ionic copolymer is treated to introduce cationic substituents therein and the resulting polymer is dispersed in water.

The procedure of Example 6 is repeated through the point at which a free-flowing powder is obtained. To 50 g. of this powder is added 225 g. of ethylenediamine and the mixture is stirred for 4 hours at 50° C. The ethylenediamine is then stripped off under vacuum. The resulting polymer disperses in water to form a latex similar to that of Example 1.

EXAMPLE 18

The following illustrates the effectiveness of a non-ionic dispersion of the present invention by imparting dry strength in the manufacture of paper under normally unfavorable conditions.

An aqueous suspension is prepared at 0.6% consistency from unbleached kraft fibers and to this is added 3% of black liquor solids and 0.5% of alum based on the dry weight of the fibers. This represents a furnish which is unreceptive to most dry strength resins heretofore employed. The pulp has a pH of 5.5 and approximates unbleached kraft pulps used for the manufacture of wrapping paper, paper bags, and cartons. Three aliquots are taken from this pulp and one is reserved as control. To each of the others is respectively added sufficient of the latex of Example 1 (diluted to 1% polymer solids with water and adjusted to pH 7) to provide the amounts of polymer shown in the table below. The suspensions are briefly stirred to distribute the polymer among the fibers, after which the fibers are processed into paper according to standard laboratory method. The paper is formed at a basis weight of 50 lb. per 25″×40″/500 ream and is dried for 1 minute on a laboratory drum dryer having a drum temperature of 240° F.

Results are as follows:

| Sheet number: | Amount of polymer added, percent [a] | Dry strength,[b] lb./in.² |
|---|---|---|
| 1 | None (control) | 59 |
| 2 | 0.2 | 66 |
| 3 | 0.5 | 71 |

[a] Based on dry weight of fibers.
[b] Burst, by Mullen test.

EXAMPLE 19

The following illustrates the manufacture of paper by use of a polymer dispersion according to the present invention.

An aqueous suspension of unbleached northern kraft fibers is prepared at a consistency of 0.6%. Four aliquots are taken.

To one is added with gentle stirring 5.0% and 0.5% (solids based on the dry weight of the fibers) respectively of black liquor and alum as 1% solutions. The pH of the suspension is then adjusted to 6.0 and the suspension is stirred briefly. Then the dry strengthening polymer dispersion of Example 8 is then added, also as a 1% solution.

The second aliquot is treated in the same manner except that the black liquor is omitted.

The third aliquot is processed into paper with addition of black liquor and alum, but without addition of the dry strength polymer.

The fourth aliquot is treated only with alum.

All four aliquots are processed into paper by standard laboratory method, the sheets being formed at a basis weight of 100 lb. per 25"×40"/500 ream and being dried for 1½ minutes on a drum drier having a drum temperature of 240° F.

Results are as follows:

| Sheet number | Percent bl. liquor added[1] | Percent alum added | Percent polymer added | Pulp freeness[2] | Dry strength Internal bond[3] | Dry strength Burst[4] |
|---|---|---|---|---|---|---|
| 1 | 5.0 | 0.5 | 0.2 | 650 | 0.098 | 79.2 |
| 2 | None | 0.5 | 0.2 | 665 | 0.105 | 82.0 |
| 3 | 5.0 | 0.5 | None | 630 | 0.073 | 71.4 |
| 4 | None | 0.5 | None | 640 | 0.078 | 71.0 |

[1] Solids, based on dry weight of fibers.
[2] Cc., by Canadian standard test.
[3] Ft.-lb./in.² of paper; force required to split the paper into two laminae. Measures strength of fiber-to-fiber bonding.
[4] Lb./in.², by Mullen test.

It will be seen that the process of the present invention caused a significant increase in the burst strength of the paper and a major increase in the internal bond of the paper.

EXAMPLE 20

The following illustrates the effectiveness of a non-ionic polymer dispersion as dry strengthening agent in the manufacture of paper from bleached fibers in the absence of alum or other additive.

Bleached northern kraft fibers are slurried in water and beaten to a Canadian standard freeness of 500 ml. The resulting suspension has a pH of 7. To this is added 1% based on the dry weight of the fibers of the aqueous polymer dispersion of Example 1 diluted to 1% polymer solids and adjusted to pH 7. The suspension is processed into paper by the method of Example 18 in comparison with a control prepared in the same way without addition of the latex. The dry strength of the paper containing the polymer is 35 lbs. per inch whereas the dry strength of the control is 28 lbs. per inch.

EXAMPLE 21

The following illustrates the effect of a polymer dispersion of the present invention in broadening the pH range in which rosin size can be successfully applied to cellulose papermaking fibers.

An aqueous suspension is prepared at 0.6% consistency from bleached northern kraft fibers beaten to a freeness of 450 cc. Four aliquots are taken. To each is added 0.5% of rosin size and 1.0% of alum and are respectively adjusted to pH 4.5, 5, 6, and 7. To each is then added sufficient of the polymer dispersion of Example 1 (diluted to 1% polymer solids and adjusted to pH 7) to provide 0.2% of the polymer based on the dry weight of the fibers. The pH of the respective aliquots is then readjusted to its former value. The suspensions are then processed into paper by the method of Example 18, and the resulting samples of paper are tested to determine their dry strength and sizing. Results are as follows:

| Run number | Pulp, pH | Paper dry strength,[a] lb./in.² Without polymer | With polymer | Sizing[b] Without polymer | With polymer |
|---|---|---|---|---|---|
| 1 | 4.5 | 51 | 60 | 180 | 310 |
| 2 | 5.0 | 56 | 64 | 200 | 360 |
| 3 | 6.0 | 58 | 66 | 20 | 205 |
| 4 | 7.0 | 55 | 66 | 0 | 60 |

[a] By Mullen test.
[b] Ink penetration test (seconds for reflectance of paper to drop by 20%).

The results show that the polymer produced excellent dry strength even at pH 7, and caused the rosin size to impart very satisfactory sizing at a pH at which it otherwise would have produced little or no sizing.

EXAMPLE 22

The following illustrates the proportion of a non-ionic polymer of the present invention which is adsorbed by rosin sized unbleached cellulose fibers in the presence and absence of black liquor and excess dissolved sulfate ions, simulating recycled white water.

The example is performed on a continuous papermaking machine fed with a stock of unbleached prime kraft pulp refined to a Canadian standard freeness of 650° cc. Additions are made to the pulp in the machine chests in the following sequence: black liquor, rosin size, sodium sulfate (to supply $SO_4^{--}$), sulfuric acid (to adjust the pH of the furnish to 7.0–7.5), alum (1.0% on dry weight of pulp), which decreases the pH to approximately 6.0. At the fan pump is added 0.2% (solids based on the dry weight of the fibers) of the polymer colloid dispersion of Example 1.

The paper is made at a basis weight of 150 lbs. per 25"×40"/ream, and is dried on rolls having a surface temperature of 190° F.–230° F. The retention of polymer is determined by nitrogen analysis of the paper.

Control paper is made in the same manner except addition of the polymer dispersion is omitted.

Results are as follows:

| Run | Agents added [a] | | | | | Paper dry strength [b] | |
|---|---|---|---|---|---|---|---|
| | Black liquor | Rosin size | SO$_4$--, p.p.m. | Alum | Polymer | Lb./in.$^2$ | Percent increase |
| 1 | None | 0.15 | 200 | 1.0 | None | 94.5 | |
| 2 | None | 0.15 | 200 | 1.0 | 0.25 | 108.9 | 15.2 |
| 3 | None | 0.15 | 200 | 1.0 | 0.50 | 115.4 | 22.1 |
| 4 | 2.0 | 0.10 | 200 | 1.0 | None | 92.6 | |
| 5 | 2.0 | 0.10 | 200 | 1.0 | 0.50 | 109.7 | 18.5 |
| 6 | 3.0 | 0.05 | 200 | 1.0 | None | 93.0 | |
| 7 | 3.0 | 0.05 | 200 | 1.0 | 0.50 | 109.2 | 17.4 |
| 8 | 3.0 | None | 1,000 | 1.0 | None | 94.1 | |
| 9 | 3.0 | None | 1,000 | 1.0 | 0.25 | 106.5 | 12.5 |
| 10 | 3.0 | None | 1,000 | 1.0 | 0.50 | 109.2 | 16.0 |
| 11 | 3.0 | None | 2,000 | 1.0 | 0.50 | 108.6 | 15.0 |

[a] Percents based on dry weight of the fibers.
[b] Burst, by Mullen test.

EXAMPLE 23

The following illustrates the effectiveness of the polymer colloid of the present invention as dry strengthening agent in the manufacture of paper under acid, neutral, and alakline conditions.

An aqueous suspension of unbleached northern kraft fibers beaten to a standard Canadian freeness of 550 cc. is adjusted to a consistency of 0.6%. To this is added 5% of black liquor followed by 0.5% of alum (solids based on the dry weight of the fibers) and sufficient sodium sulfate to provide 500 p.p.m. of sulfate ions to simulate a recycled white water system.

Twelve aliquots are taken and pairs are respectively adjusted to pH 5, 6, 7, 8, 9 and 10. To one of each pair is added 0.4% of the polymer colloid dispersion of Example 1 (polymer solids based on the dry weight). The aliquots are gently stirred for a few moments and are then processed into paper at 100 lb. basis weight and the dry strengths of the handsheets are determined by standard laboratory method.

Results are as follows:

| | Freeness, cc. | | Dry strength [a] | |
|---|---|---|---|---|
| pH | No polymer | With polymer | No polymer | With polymer |
| 5.0 | 665 | 678 | 70.5 | 86.5 |
| 6.0 | 660 | 678 | 72.0 | 88.1 |
| 7.0 | 668 | 675 | 74.1 | 89.0 |
| 8.0 | 662 | 675 | 74.6 | 90.0 |
| 9.0 | 658 | 675 | 75.0 | 90.6 |
| 10.0 | 660 | 678 | 75.8 | 90.7 |

[a] Lb./in.$^2$; by Mullen test.

The results show that the performance of the polymer colloid both as drainage aid and as dry strength agent is practically independent of the pH of the pulp to which the polymer colloid is added.

EXAMPLE 24

The following illustrates the manuacture of paper of improved dry strength according to the present invention by addition of an acrylamide-hydrophobic vinyl polymer having a content of hydrophilic cationic linkages. The polymer used is prepared by reacting an 89:11 molar ratio acrylamide-styrene polymer (viscosity 2,200 centipoises at 25° C., pH 7 and 10% solids) with ethylenediamine. The polymer was only moderately cationic when tested in an electrophoretic cell, indicating that only a small proportion of the acrylamide linkages had been converted to aminoethylacrylamide or other cationic linkages.

To an aqueous suspension of unbleached kraft pulp beaten to a Canadian standard freeness of 625 cc. at 0.7% consistency is added 3% of black liquor and 1% of alum (solids based on the dry weight of the fibers), and sufficient sodium sulfate to provide 200 p.p.m. of SO$_4$--. The furnish is then adjusted to pH 5.5 with hydrochloric acid.

Three aliquots are taken from the pulp. One aliquot is left untreated as control. To the others are respectively added 0.2% and 0.5% of a 1% by weight aqueous solution of the above-described cationic polymer (solids based on the dry weight of the fibers). Handsheets are prepared by standard laboratory procedure at a basis weight of 100 lb. per 25"×40"/500 ream, which are dried for 1.5 minutes on a drum drier having a drum temperature of 240° F. The dried sheets are conditioned for 24 hours at 73° F. and 50% relative humidity and their dry strength determined. Results are as follows:

| Sheet number | Polymer added | Freeness, cc. | Dry strength | |
|---|---|---|---|---|
| | | | Burst, lb./in.$^2$ | Internal bond ft.-lb./in. |
| Control | None | 450 | 60 | 0.06 |
| 1 | 0.2 | 500 | 70 | 0.09 |
| 2 | 0.5 | 540 | 76 | 0.11 |

EXAMPLE 25

The following illustrates the strengthening which is imparted by the polymer of the present invention when added to a substantially all-groundwood pulp for the manufacture of newsprint.

An aqueous suspension is prepared at 0.6% consistency from an 85:15 by weight groundwood:bleached kraft pulp having a Canadian standard freeness of 375 cc. Six aliquots are taken, to which are respectively added alum and the colloidal polymer dispersion of Example 1 in the amounts shown in the table below. The pH of the aliquots to which alum is added is adjusted to 4.5. The freeness of the treated aliquots is determined immediately before sheeting. The aliquots are processed into paper and the handsheets are tested by the method of Example 18. Results are as follows:

| Run number | Percent added [a] | | Pulp freeness, cc. | Paper Strength | |
|---|---|---|---|---|---|
| | Alum | Polymer | | Burst, lb./in.$^2$ | Internal bond ft.-lb./in. |
| 1 | None | None | 375 | 16.8 | 0.037 |
| 2 | None | 0.3 | 405 | 20.4 | 0.050 |
| 3 | None | 1.0 | 470 | 23.7 | 0.068 |
| 4 | 1.0 | None | 400 | 15.8 | 0.039 |
| 5 | 1.0 | 0.3 | 460 | 20.9 | 0.058 |
| 6 | 1.0 | 1.0 | 510 | 23.2 | 0.071 |

[a] Based on dry weight of fibers.

The results show that the polymer of the present invention substantially improves both the freeness of the pulp and the dry strength of the paper in the presence and absence of alum.

EXAMPLE 26

The following illustrates the preparation of a nonionic polymer of the present invention which carries a substantial proportion of thermosetting substituents and so imparts wet strength in addition to dry strength.

The procedure of Example 1 is repeaed except that the starting polymer is an 80:5:15 percent by weight acrylamide:acrylonitrile:styrene interpolymer. The amount of ammonium persulfate catalyst is increased to 1.5 g. The reaction mixture is stirred rapidly during the polymerization, and the polymerization temperature is raised to reflux. A similar hazy colloid solution is obtained which however has a viscosity of about 15 centipoises at 10% solids. To this is added 76 g. of a 40% by weight aqueous solution of glyoxal. The mixture is diluted to 11% polymer and polymerizable solids content and is allowed to stand at room temperature and pH 8 until it has started to increase in viscosity (about 2 hours). The pH is then lowered to 3 and the polymer is ready for use when it has a Gardner-Holdt viscosity of B–C at 30° C.

When the polymer is in thermoset state on the fibers, the acrylamide linkages act as dry strengthening component and the glyoxalated acrylamide linkages act as wet strengthening component.

EXAMPLE 27

The following illustrates the production of paper possessing improved wet and dry strength by use of a non-ionic polymer according to the present invention.

An aqueous suspension of well beaten unbleached southern kraft pulp is prepared at a consistency of 0.6% and pH 6.0. Four aliquots are taken. One is reserved as control. To the others are respectively added the amounts of the polymer dispersion of Example 26 (diluted to 1% solids) to provide the amounts of polymer shown in the table below. All four aliquots are processed into handsheets at 50 and 100 lb. basis weight by standard laboratory procedure. The handsheets are dried on a laboratory drum drier having a drum temperature of 240° F., which thermosets the polymer. The wet and dry strengths of the sheets are determined with results as follows:

| | Percent polymer added [a] | Dry strength,[b] lb./in.² | Wet strength, lb./in. |
|---|---|---|---|
| Sheet number: | | | |
| 1 | 0.1 | 74 | 3.4 |
| 2 | 0.2 | 80 | 4.1 |
| 3 | 0.3 | 86 | 4.6 |

[a] Based on dry weight of fibers.
[b] By Mullen test.

EXAMPLE 28

The following illustrates the preparation and properties of a non-ionic thermosetting acrylamide-styrene copolymer which imparts both wet and dry strength.

Preparation of Starting Copolymer.—To a 3-necked flask equipped with stirrer, condenser, thermometer, nitrogen gas inlet tube and three dropping funnels containing 600 g. of water at reflux are added separately and simultaneously over one hour (1) a solution of 2.4 g. of sodium dicyclohexylsulfosuccinate as emulsifying agent, and 210 g. of acrylamide in 646 g. of water, (2) a solution of 1.19 g. of ammonium persulfate in 100 g. of water, and (3) 28 g. of styrene. The reaction mixture is refluxed for 1.5 hours and then cooled to room temperature. The product is an off-white hazy colloidal dispersion of polymer having a viscosity of 114 cps. at 15% solids at room temperature.

Reaction With Glyoxal.—A 250 g. portion of this dispersion is diluted to 10% solids with water and is further diluted by addition of 150 g. of water. To this dispersion is added 1.5 g. of 40% aqueous glyoxal solution and the pH of the mixture is adjusted to 8.6. Water is then added to bring the total weight of the mixture to 450 g. The mixture is maintained at 25° C. until just short of gelation. The mixture is then adjusted to pH 3.5 and diluted to 5% solids by addition of water. The polymer carries glyoxal substituents and carries a sufficient proportion thereof so that it is thermosetting. It is stable for more than one week at room temperature.

EXAMPLE 29

The following illustrates the properties of the dispersion of Example 28 in imparting wet and dry strength.

A papermaking fibrous suspension is prepared at 0.6% consistency from well-beaten unbleached kraft fibers, and to this is added 3% of black liquor and 1% of alum (solids based on the dry weight of the fibers), after which the pH of the suspension is adjusted to 5.5. Three aliquots are taken. One is reserved as control. To the others are added the amounts of polymer shown below. The suspensions are adjusted to pH 5.5 and are processed into paper at 50 lb. basis weight by standard laboratory procedure (the sheets being dried 1.5 minutes on a laboratory drum drier having a drum temperature of 240° F.). Results are as follows:

| | Percent polymer added [a] | Dry strength,[b] lb./in.² | Wet strength,[c] lb./in. |
|---|---|---|---|
| Sheet number: | | | |
| 1 | None | 26.0 | 0.6 |
| 2 | 0.2 | 30.5 | 4.1 |
| 3 | 0.5 | 32.4 | 6.5 |

[a] Based on dry weight of fibers.
[b] Burst, by Mullen test.
[c] Tensile.

EXAMPLE 30

The following illustrates the preparation of a colloidal dispersion of moderate viscosity from a non-ionic polymer wherein the hydrophobic linkages are acrylonitrile linkages.

In a flask is placed 1467 g. of acrylamide crystals, 489 g. of acrylonitrile and 10.7 kg. of water. The mixture is warmed to 30° C. and purged of oxygen with nitrogen gas. To this is then added 0.975 g. of ammonium persulfate, dissolved in 33 ml. of oxygen-free water. The mixture is heated at 75° C. for two hours. Then 1.95 g. of ammonium persulfate, dissolved in 365 g. of deoxygenated water, is added and the reaction maintained at 77° C. for two hours.

A viscous hazy colloid dispersion results. The dispersion is cooled to 25° C. diluted to 10% solids, and adjusted to pH 7. The viscosity of the dispersion at 25° C. and pH 7 is 35,500 centipoises (Brookfield). The polymer is composed of acrylamide and acrylonitrile linkages in about 75:25 weight ratio (70:30 mol ratio).

EXAMPLE 31

The resulting dipersion is diluted to 1% solids and added to an unbleached pulp at 0.6% consistency at pH 5 containing 3% black liquor, 1% alum, and 200 p.p.m. of $SO_4^=$ ions in amounts sufficient to supply the amounts of polymer shown in the table below, after which the fibers are processed into paper at 50 lb. basis weight by standard laboratory procedures and the dry strengths of the resulting sheets are determined. Results are as follows:

| | Dry strength | |
|---|---|---|
| Percent polymer added [a] | Burst [b] (lbs./in.²) | Internal bond (ft.-lbs./in.²) |
| None | 33.8 | 0.060 |
| 0.2 | 40.6 | 0.077 |
| 0.5 | 47.7 | 0.089 |

[a] Based on dry weight of fibers.
[b] By Mullen test. Corrected to 50 lb. basis not (25/40×500).

EXAMPLE 32

The following illustrates the preparation of an aqueous dispersion of a substantially non-ionic 90:10 molar ratio acrylamide-styrene copolymer of low viscosity, according to the present invention.

To a solution of 100.7 g. of acrylamide and 1.2 g. of sodium dicyclohexylsulfosuccinate in water at pH 4.5 is added with stirring 18.3 g. of styrene. The resulting emulsion is sparged with nitrogen gas for 20 minutes, until oxygen-free. The emulsion is heated to 75° C. under a blanket of nitrogen gas and 0.45 g. of ammonium persulfate catalyst is then added, which initiates the polymerization reaction. The reaction mixture is maintained at 65°

C.–85° C. for seven hours, by which time the polymerization is complete. The product is a hazy viscous dispersion which at 10% polymer content, 25° C., and pH 7 has a viscosity of 760 centipoises (Brookfield).

EXAMPLE 33

The following illustrates the strengthening effect of a polymer of the present invention of low molecular weight in the manufacture of filled paper from bleached fibers which have been rosin-sized.

To an aqueous suspension at 0.7% consistency of a highly bleahced 40:60 by weight mixture of softwood:hardwood fibers beaten to a Canadian standard freeness of 420 ml. is added 10% of papermaker's clay filler, 1.5% of alum and 1.0% of a commercial fortified rosin size (solids based on the dry weight of the fibers).

The stock is gently stirred to render it homogeneous and is adjusted to pH 5.0. Two aliquots are taken. One is left untreated as control. To the second is added sufficient of the colloidal dispersion of Example 32 to provide 0.2% of the polymer based on the dry weight of the fibers. Agitation is continued for 30 seconds. Handsheets are formed from the aliquots at 50 lb. basis weight which are dried and their dry strength and sizing determined by standard laboratory procedure. Results are as follows:

| Run | Percent polymer added [1] | Dry strength Burst [2] | Internal bond [3] | Ink sizing sec. [4] |
|---|---|---|---|---|
| A | None | 26.1 | 0.065 | 105 |
| B | 0.5 | 30.2 | 0.093 | 173 |

[1] Based on dry weight of the fibers.
[2] Lb./in.², by Mullen test.
[3] Ft.-lb./in.².
[4] Seconds to produce 20% drop in reflectance from underside below applied pool of ink.

EXAMPLE 34

The following illustrates the preparation of a polymer dispersion according to Example 32 of moderate viscosity.

The procedure of Example 32 is repeated except that the amount of ammonium persulafte is decreased to 0.20 g. The product is a hazy colloidal dispersion which when adjusted to pH 7.0, 25° C. and 10% polymer content has a viscosity of 18,500 centipoises (Brookfield).

EXAMPLE 35

The following illustrates, the dry strength imparted by the polymer dispersion of intermediate viscosity of Example 34.

The procedure of Example 33 is repeated except that the polymer dispersion of Example 34 is employed in place of the polymer dispersion of Example 32, and the amount of polymer which is added to the pulp is decreased to 0.2%. Results are as follows:

| Run | Percent polymer added [1] | Dry strength Burst [1] | Internal bond [1] | Ink sizing sec. [1] |
|---|---|---|---|---|
| A | None | 26.1 | 0.065 | 105 |
| B | 0.2 | 32.5 | 0.091 | 198 |

[1] For notes see Example 33.

EXAMPLE 36

The following illustrates the preparation of a very high viscosity dispersion of a non-ionic polymer according to Example 32.

The procedure of Example 32 is repeated except that the amount of catalyst is decreased to 0.12 g. and the polymerization is performed at 63° C. The product is an opaque gel which is water-dilutable. It remains a gel when diluted to 10% polymer content. The viscosity of the gel is estimated as more than 200,000 centipoises at pH 7 and 25° C. Dilution of the polymer to 1.0% polymer content provides a hazy viscous dispersion of pumpable viscosity.

EXAMPLE 37

The following illustrates the dry strength which is imparted by the non-ionic polymer dispersion of Example 36 at very high viscosity. A fibrous papermaking suspension at 0.6% consistency is prepared from unbleached kraft fibers, 3% black liquor (solids on the dry weight of the fibers), 1% alum on the dry weight of the fibers and 200 p.p.m. of dissolved sulfate ions, on the gross weight of the suspension. Two aliquots are taken. One is reserved as control. To the other is added sufficient of the dispersion of Example 36 to provide 0.4% of the polymer based on the dry weight of the fibers. The resulting suspensions are processed into paper which is tested, in accordance with standard laboratory procedure. Results are as follows:

| Run | Percent polymer added [1] | Dry strength Burst [1] | Internal bond [1] |
|---|---|---|---|
| A | None | 34.1 | 0.062 |
| B | 0.4 | 48.6 | 0.103 |

[1] See Example 33.

I claim:

1. An aqueous dispersion consisting essentially of a vinylamide polymer useful as a strengthening agent in the manufacture of paper, consisting essentially of at least 60 weight percent of unsubstituted acrylamide linkages as dry strengthening components and at least 5 weight percent of hydrophobic vinyl linkages as components improving the adsorptivity of said polymer by cellulose fibers in aqueous suspension, the ratio between said acrylamide and hydrophobic linkages being between about 60:40 and 95:5 by weight and being such within said range that the polymer is substantially autodispersible in water; said dispersion at 10% by weight polymer content, at pH 7.0 and at 25° C. having a viscosity in the range of 250 to 200,000 centipoises.

2. A dispersion according to Claim 1 wherein the polymer contains up to 20 mol percent of hydrophilic anionic substituents.

3. A dispersion according to Claim 1 wherein the polymer contains up to 20 mol percent of hydrophilic cationic substituents.

4. A dispersion according to Claim 1 wherein the hydrophobic linkages of the polymer are styrene linkages.

5. A dispersion according to Claim 1 wherein the hydrophobic linkages of the polymer are methyl methacrylate linkages.

6. A dispersion according to Claim 1 wherein the hydrophobic linkages of the polymer are acrylonitrile linkages.

7. A dispersion according to Claim 1 wherein the polymer consists essentially of acrylamide and styrene linkages in 90:10 molar ratio.

8. A dispersion according to Claim 1 wherein the polymer consists essentially of acrylamide, acrylic acid and styrene linkages in about 85:5:10 molar ratio.

9. A dispersion according to Claim 1 wherein the polymer consists essentially of acrylamide, di(methylaminomethyl)acrylate and styrene linkages in about 85:5:10 molar ratio.

10. A dispersion according to Claim 1 wherein the polymer consists essentially of acrylamide and acrylonitrile linkages in about 70:30 molar ratio.

11. A dispersion according to Claim 1 wherein the viscosity of said dispersion is in the range of 500 to 100,000 centipoises.

References Cited
UNITED STATES PATENTS

| | | | |
|---|---|---|---|
| 2,884,057 | 4/1959 | Wilson et al. | 260—89.7 N |
| 3,395,072 | 7/1968 | Talet et al. | 260—73 R |
| 3,450,680 | 6/1969 | Jursich et al. | 260—29.6 TA |
| 3,549,568 | 1/1970 | Coscia et al. | 260—17.3 |
| 3,556,932 | 1/1971 | Coscia et al. | 260—72 R |
| 3,658,772 | 4/1972 | Volk et al. | 260—29.6 TA |
| 3,663,490 | 5/1972 | Serem | 260—29.6 TA |

LUCILLE M. PHYNES, Primary Examiner

U.S. Cl. X.R.

260—29.6 H, 32.8 N, 33.4 R, 72 R, 73 L, 79.3 A & R, 80.3 N, 80.73, 80.8, 85.5 AM, 85.7, 86.7; 162—168

UNITED STATES PATENT OFFICE
CERTIFICATE OF CORRECTION

Patent No. 3,840,489                                Dated October 8, 1974

Inventor(s) EDWARD STRAZDINS

It is certified that error appears in the above-identified patent and that said Letters Patent are hereby corrected as shown below:

Column 1 line 71. Change "acide:acrylic" to -- amide : acrylic --.
Column 4 line 13. Change "vinylphthlate" to -- vinylphthalate --.
Column 6 line 61. Change "heat, the" to -- heat. The --.
Column 7 line 6. After "Preferably," add -- the --.
Column 12 line 19. Change "are" to -- each is --; Column 12 line 71. Change "25" x 40"/ream" to -- 25" x 40"/500 ream --.
Column 13 line 60. Change "acrylamide-styrene" to -- acrylamide : styrene --.
Column 14 in the table at lines 30-35. Change the right-hand column to read -- Internal
bond
ft.-lb./in.$^2$
    0.062
    0.091
    0.111 --; Column 14 in the table at line 57. In the heading of the right-hand column, change "ft.-lb./in." to -- ft.-lb./in.$^2$ --.
Column 16 line 66. Change "acrylamide-styrene" to -- acrylamide : styrene --.
Column 17 line 57. After "illustrates" delete -- , --.

Signed and sealed this 18th day of February 1975.

(SEAL)
Attest:

RUTH C. MASON
Attesting Officer

C. MARSHALL DANN
Commissioner of Patents
and Trademarks